United States Patent
Ninomiya et al.

(10) Patent No.: US 9,347,580 B2
(45) Date of Patent: May 24, 2016

(54) VALVE DEVICE

(71) Applicant: KAWASAKI JUKOGYO KABUSHIKI KAISHA, Kobe-shi, Hyogo (JP)

(72) Inventors: Makoto Ninomiya, Kobe (JP); Kaoru Nomichi, Ono (JP); Tadahiko Kuroda, Akashi (JP); Yutaka Suzuki, Kobe (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 163 days.

(21) Appl. No.: 14/190,696

(22) Filed: Feb. 26, 2014

(65) Prior Publication Data

US 2014/0239207 A1    Aug. 28, 2014

(30) Foreign Application Priority Data

Feb. 26, 2013    (JP) .................. 2013-036107

(51) Int. Cl.
 *F16K 31/06*    (2006.01)
 *F16K 31/42*    (2006.01)
 *F17C 13/00*    (2006.01)
 *F16K 1/30*    (2006.01)
 *F17C 13/04*    (2006.01)

(52) U.S. Cl.
CPC ............... *F16K 31/0675* (2013.01); *F16K 1/30* (2013.01); *F16K 31/42* (2013.01); *F17C 13/00* (2013.01); *F17C 13/04* (2013.01); *F17C 2201/0109* (2013.01); *F17C 2201/056* (2013.01); *F17C 2201/058* (2013.01); *F17C 2203/0617* (2013.01); *F17C 2205/0326* (2013.01); *F17C 2205/0385* (2013.01); *F17C 2205/0391* (2013.01); *F17C 2223/0123* (2013.01)

(58) Field of Classification Search
CPC ........... F17C 13/004; F17C 2205/0385; F17C 2205/0326; F17C 2205/0391; F16K 17/10; F16K 31/408; F16K 31/0675; Y02E 60/50; G05D 16/20
USPC ..................... 251/129; 137/630.15
See application file for complete search history.

(56) References Cited

U.S. PATENT DOCUMENTS 2,830,743 A * 4/1958 Rimsha .................. F16K 21/16
                                              222/335
6,557,821 B2 * 5/2003 Girouard ................ F16K 1/302
                                              251/30.01

(Continued)

FOREIGN PATENT DOCUMENTS

JP    2004-515717 A    5/2004
JP    A-2008-232440   10/2008
JP    2012-057678 A    3/2012

*Primary Examiner* — Marina Tietjen
*Assistant Examiner* — Daphne M Barry
(74) *Attorney, Agent, or Firm* — Oliff PLC (57) ABSTRACT

A valve device of the present invention includes: a main valve body interposed between a first pressure chamber of a main passage and a second pressure chamber; and a pilot valve body provided in the second pressure chamber. A first pilot passage including a first restrictor extends from an outside of a housing or a primary passage to the second pressure chamber, and a second pilot passage including a second restrictor is formed at the main valve body. The pilot valve body is maintained at a first operation position by a pilot valve body biasing member and is caused to move to a second operation position by a valve body driving unit. When the pilot valve body is located at the second operation position, the main valve body is caused to move to an open position by a pressure difference between the first pressure chamber and the second pressure chamber.

5 Claims, 7 Drawing Sheets (56) References Cited

U.S. PATENT DOCUMENTS 6,957,661 B1 * 10/2005 Borton ................ F16K 17/0406
 137/550
7,309,113 B2  12/2007 Carter
8,245,730 B2 * 8/2012 Nomichi ............. F16K 31/0606
 137/630.15
8,257,067 B2 * 9/2012 Fukui ................... F02M 59/366
 417/505

* cited by examiner

VALVE DEVICE

BACKGROUND OF THE INVENTION

1. Field of the Invention

The present invention relates to a valve device used as, for example, a pneumatic controller or a stopper for a gas tank.

2. Description of the Related Art

For example, known as a valve device that operates under a high-pressure condition is a device including: a main valve body that opens and closes a main passage formed at a housing; and a pilot valve body that controls opening/closing operations of the main valve body. For example, Japanese Laid-Open Patent Application Publication No. 2008-232440 discloses a valve device in which a main valve body and a pilot valve body are arranged coaxially.

Figure 6:
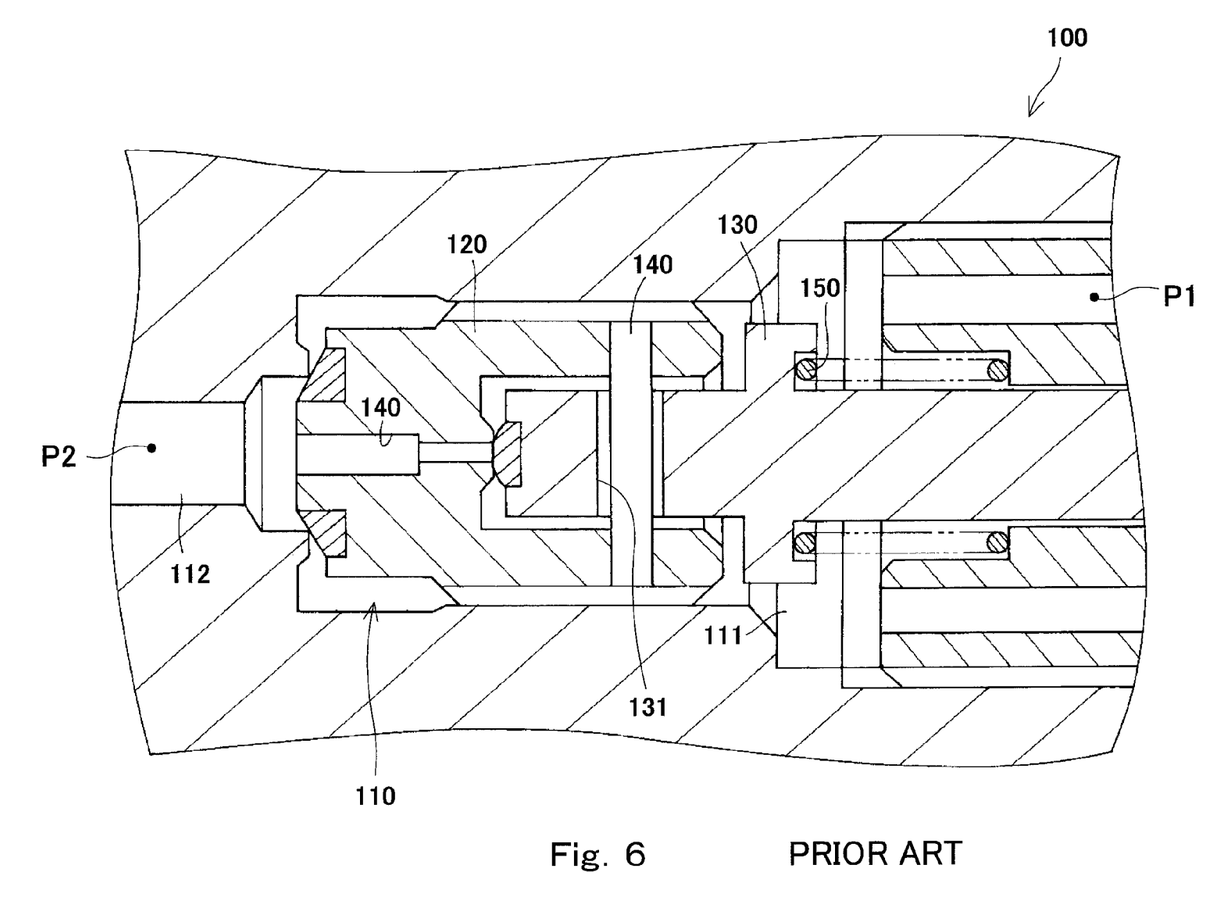
FIG. 6 is a partial cross-sectional view of a conventional valve device.

FIG. 6 shows a part of a valve device 100 disclosed in Japanese Laid-Open Patent Application Publication No. 2008-232440. In the valve device 100, a main valve body 120 performs an opening operation by an electromagnetic force generated by a current flowing through a solenoid portion (not shown) and performs a closing operation by a biasing force of a spring 150. Even in a case where a pressure difference between primary pressure P1 that is pressure of a primary passage 111 of a main passage 110 and secondary pressure P2 that is pressure of a secondary passage 112 is large, a pilot valve body 130 realizes the opening operation of the main valve body 120 by a low electromagnetic force.

Specifically, one end portion of the pilot valve body 130 is coupled to a movable core, and the other end portion of the pilot valve body 130 is coupled to the main valve body 120 via a pin 140. The pin 140 is inserted into a loose-fit hole 131 formed at the other end portion of the pilot valve body 130. When the current flows through the solenoid portion, the pilot valve body 130 first moves away from the main valve body 120 by a gap between the loose-fit hole 131 and the pin 140. With this, a communication passage 140 formed at the main valve body 120 opens, so that the primary passage 111 and the secondary passage 112 communicate with each other. After that, when the pressure difference between the primary pressure P1 and the secondary pressure P2 becomes small, the main valve body 120 performs the opening operation by the electromagnetic force of the solenoid portion.

However, according to the above mechanism in which the main valve body 120 performs the opening operation after the pressure difference between the primary pressure P1 and the secondary pressure P2 is reduced, in a case where a compression volume at a downstream side of the valve device 100 is large, a time (that is, a response time) from when the current starts flowing through the solenoid portion until when the main valve body 120 performs the opening operation may become long. In contrast, a so-called differential pressure-driven valve device 200 disclosed in U.S. Pat. No. 7,309,113 and shown in FIG. 7 has excellent responsiveness, the valve device 200 causing a main valve body 220 to perform the opening operation by a pressure difference acting on the main valve body 220.

Figure 7:
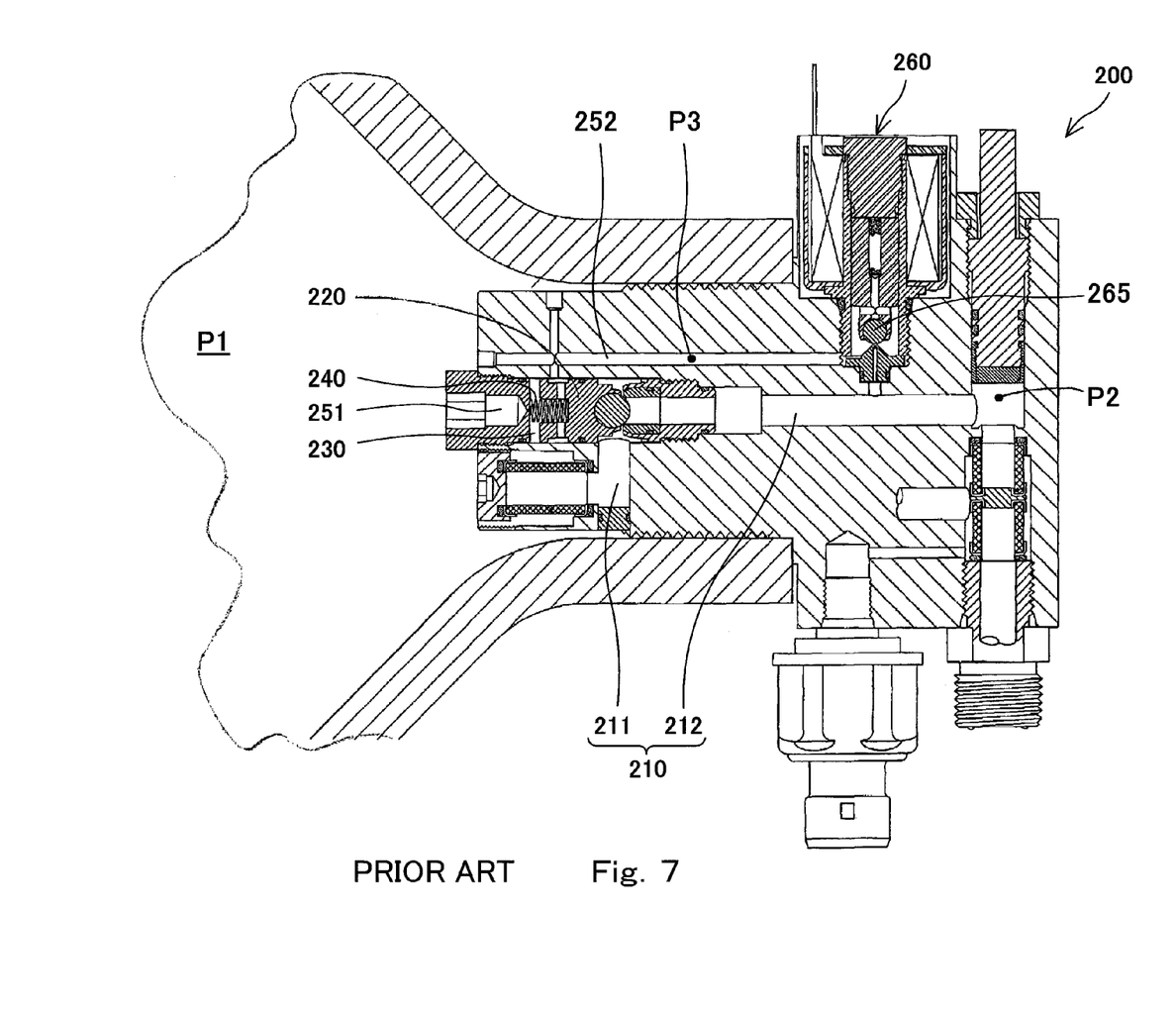
FIG. 7 is a cross-sectional view of another conventional valve device.

Specifically, in the valve device 200, a spring chamber 230 in which a spring 240 that biases the main valve body 220 in a closing operation direction is provided communicates with a tank inner space where a primary passage 211 of a main passage 210 opens, via a first pilot passage 251 and also communicates with a second pilot passage 252. A restrictor is provided at the pilot passage 251. The second pilot passage 252 is opened and closed by a pilot valve body 265. When the pilot valve body 265 opens, the second pilot passage 252 communicates with a secondary passage 212 of the main passage 210. When the second pilot passage 252 is being closed by the pilot valve body 265, pressure P3 of the spring chamber 230 is equal to the primary pressure P1. In contrast, when the pilot valve body 265 performs the opening operation by a current flowing through a solenoid portion 260, the pressure P3 of the spring chamber 230 becomes lower than the primary pressure P1 and higher than the secondary pressure P2. Thus, the main valve body 220 performs the opening operation.

SUMMARY OF THE INVENTION

However, according to the valve device 200 disclosed in U.S. Pat. No. 7,309,113, even in a case where the current is flowing through the solenoid portion 260 (the second pilot passage 252 is being opened), the main valve body 220 may perform the closing operation depending on the pressure difference between the primary pressure P1 and the secondary pressure P2. For example, when the gas flow at a downstream side of the valve device 200 is blocked, the secondary pressure P2 becomes equal to the primary pressure P1. In addition, the main valve body 220 is being biased by the spring 240 toward a closing side. Therefore, even in a case where the current is flowing through the solenoid portion 260, the main valve body 220 performs the closing operation.

Here, an object of the present invention is to provide a valve device having excellent responsiveness and capable of preventing an unexpected operation of a main valve body.

To solve the above problems, a valve device of the present invention includes: a housing at which a main passage and a second pressure chamber are formed, the main passage including a primary passage, a first pressure chamber, and a secondary passage; a main valve body interposed between the first pressure chamber and the second pressure chamber, the main valve body being configured to, when pressure of the second pressure chamber becomes lower than pressure of the first pressure chamber, move from a closed position where the main valve body isolates the first pressure chamber from the secondary passage to an open position where the main valve body causes the first pressure chamber to communicate with the secondary passage; a first pilot passage including a first restrictor and extending from an outside of the housing or the primary passage to the second pressure chamber; a second pilot passage including a second restrictor and formed at the main valve body so as to connect the second pressure chamber and the secondary passage when the main valve body is located at the closed position; a pilot valve body provided in the second pressure chamber, the pilot valve body being configured to move between a first operation position where the pilot valve body isolates the second pressure chamber from the second pilot passage and a second operation position away from the first operation position toward an opposite side of the main valve body; a pilot valve body biasing member configured to bias the pilot valve body toward the main valve body to maintain the pilot valve body at the first operation position; and a valve body driving unit configured to move the pilot valve body to the second operation position by a current flowing through the valve body driving unit, wherein: the first pressure chamber and the second pressure chamber are separated from each other by the main valve body; and a sealing member is provided between the housing and the main valve body to seal a gap between the first pressure chamber and the second pressure chamber.

According to the above configuration, when the current does not flow through the valve body driving unit, the pilot valve body is located at the first operation position, so that the pressure of the second pressure chamber becomes equal to primary pressure that is pressure of the primary passage, and the main valve body is located at the closed position. In contrast, when the current flows through the valve body driving unit, the pilot valve body moves to the second operation position, so that by the actions of the first and second restrictors, the pressure of the second pressure chamber becomes lower than the primary pressure that is the pressure of the primary passage and higher than secondary pressure that is pressure of the secondary passage. With this, the main valve body performs the opening operation. To be specific, when the current flows through the valve body driving unit, the main valve body performs the opening operation by the pressure difference, acting on the main valve body, between the first pressure chamber and the second pressure chamber, and the other force of biasing the main valve body in a closing direction does not act on the main valve body. Therefore, excellent responsiveness can be realized. Further, since the biasing force of the pilot valve body biasing member for seating the pilot valve body and the main valve body (i.e., for maintaining the pilot valve body at the first operation position and maintaining the main valve body at the closed position) can be reduced, required thrust of the valve body driving unit can be reduced. As a result, there is obtained an advantage of being able to reduce the size of the valve body driving unit. In addition, while the current is flowing through the valve body driving unit, the pilot valve body is maintained at the second operation position, and the biasing force of the pilot valve body biasing member does not act on the main valve body, so that the main valve body is prevented from performing the closing operation.

The valve device of the present invention may further include a main valve body biasing member configured to bias the main valve body toward the pilot valve body to maintain the main valve body at the open position when the pilot valve body is located at the second operation position.

According to this configuration, when the current flows through the valve body driving unit, and the pilot valve body is located at the second operation position, the main valve body is biased in a direction toward the open position by the main valve body biasing member. Therefore, further excellent responsiveness can be realized. At this time, the main valve body is maintained at the open position by the main valve body biasing member. Therefore, even if the pressure of the second pressure chamber becomes equal to the primary pressure, the open state of the main valve body is surely held.

The valve device of the present invention may be configured such that: a stroke of a movement of the pilot valve body between the first operation position and the second operation position is longer than a stroke of a movement of the main valve body between the closed position and the open position; and when the pilot valve body is located at the second operation position, and the main valve body is located at the open position, a gap is formed between the pilot valve body and the main valve body. According to this configuration, the main valve body can be stably maintained at the open position.

The valve device of the present invention may be configured such that: the valve device is incorporated in a pressure vessel so as to be partially exposed from the pressure vessel; the primary passage and the first pilot passage communicate with an inside of the pressure vessel; and the valve body driving unit is provided inside the pressure vessel.

According to this configuration, even in a case where an impact is externally applied to the pressure vessel by an accident or the like, a main body of the valve device does not directly receive the external force, so that the valve device does not receive the damage that causes the valve device to become an open state. On this account, a fluid in the pressure vessel does not flow out.

The present invention can provide the valve device having excellent responsiveness and capable of preventing unexpected operations of the main valve body.

The above object, other objects, features and advantages of the present invention will be made clear by the following detailed explanation of a preferred embodiment with reference to the attached drawings.

DESCRIPTION OF THE PREFERRED EMBODIMENTS

Figure 1:
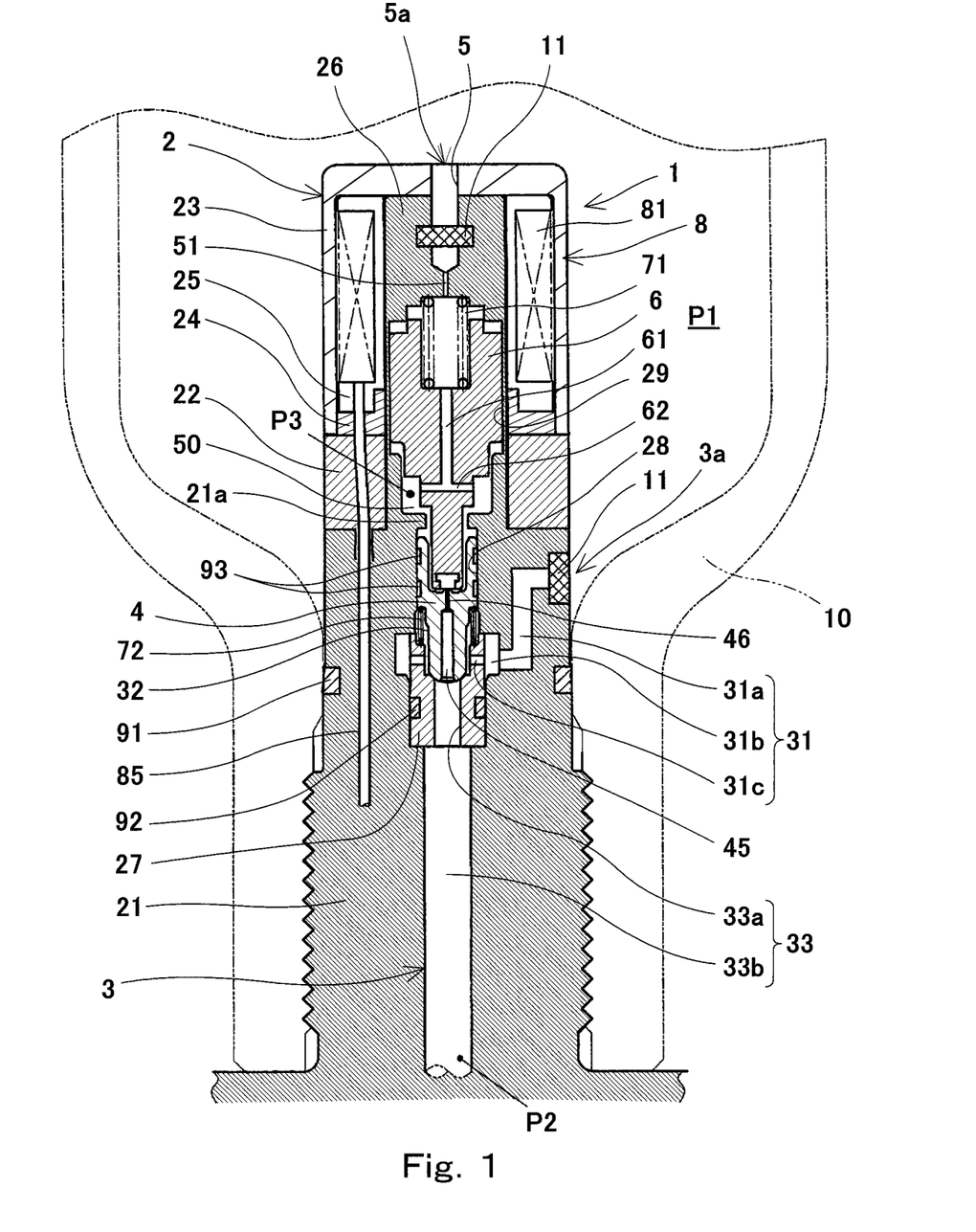
FIG. 1 is a cross-sectional view of a valve device according to one embodiment of the present invention.
Figure 2:
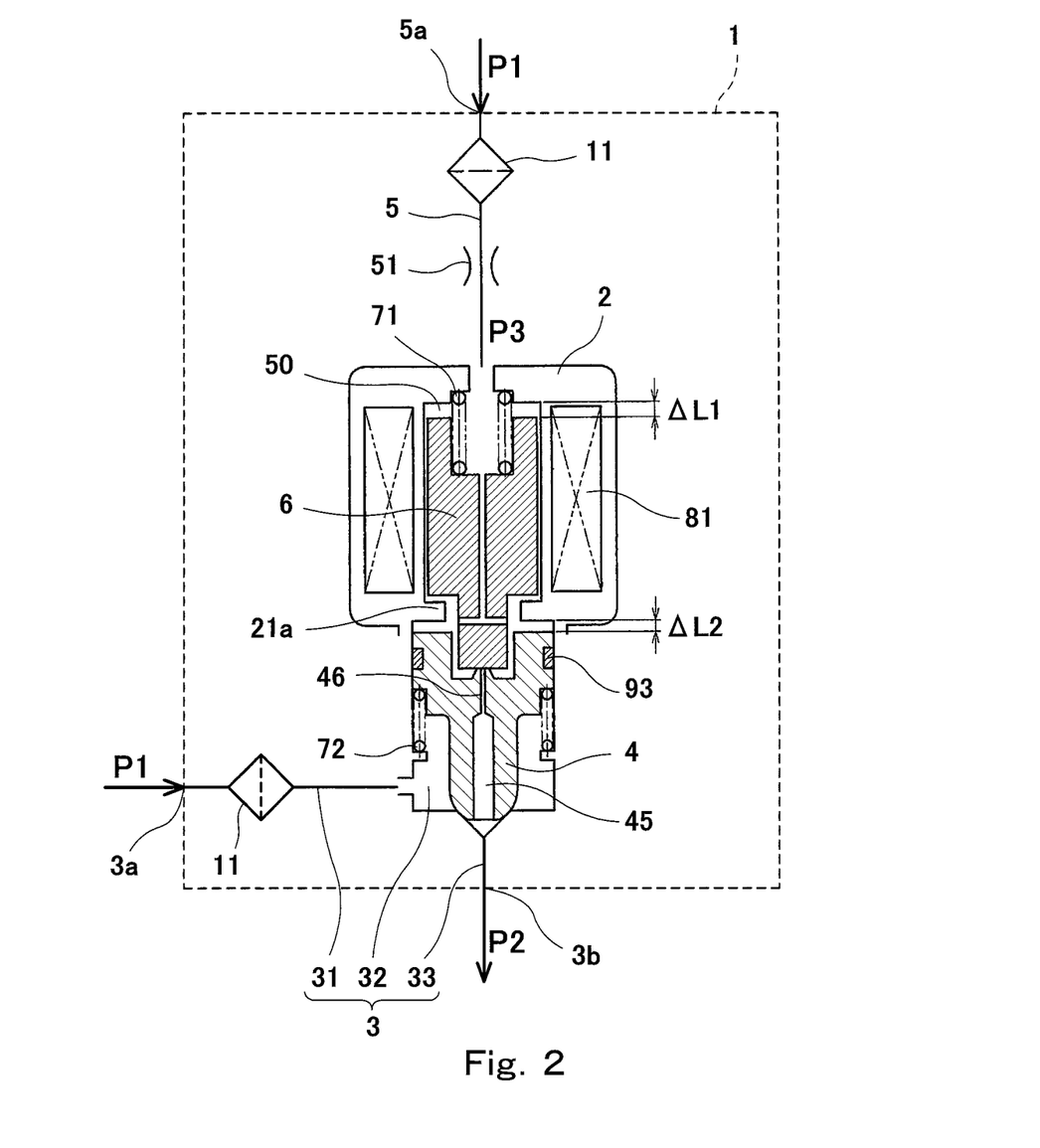
FIG. 2 is a schematic diagram of the valve device shown in FIG. 1.

FIG. 1 shows a valve device 1 according to one embodiment of the present invention, and FIG. 2 shows a schematic diagram of the valve device 1. The valve device 1 of the present embodiment is an in-tank type solenoid valve inserted into a gas tank 10 that is a pressure vessel. Specifically, the valve device 1 is incorporated in the gas tank 10 so as to be partially exposed from the gas tank 10. However, the present invention is also widely applicable to valve devices other than the in-tank type solenoid valve.

The valve device 1 includes a housing 2. The valve device 1 also includes a solenoid portion 8 as a valve body driving unit, a main valve body 4 and a pilot valve body 6 that are provided in the housing 2. A portion of the housing 2 which portion is being inserted into the gas tank 10 has a substantially cylindrical shape, and the main valve body 4 and the pilot valve body 6 are provided on a center line of the housing 2. In the following explanation, for convenience of explanation, a direction along the center line of the housing 2 and toward an inner side of the gas tank 10 is referred to as an upper direction, and a direction along the center line of the housing 2 and toward an outer side of the gas tank 10 is referred to as a lower direction.

Instead of the solenoid portion 8, a piezoelectric actuator may be used as the valve body driving unit. The piezoelectric actuator is constituted by a piezoelectric element (piezo element). The piezoelectric actuator generates a driving force corresponding to an applied voltage. A force motor may be used instead of the solenoid portion 8. The force motor is configured such that a movable coil is inserted into a cylindrical permanent magnet. When a current is applied to the movable coil, a magnetizing force corresponding to the current is generated, and the movable coil moves by this magnetizing force.

The valve device 1 of the present embodiment including the solenoid portion 8 as the valve body driving unit is the in-tank type solenoid valve inserted into the gas tank 10.

Therefore, even in a case where an impact is externally applied to the gas tank 10 by an accident or the like, a main body of the valve device 1 (especially, the solenoid portion 8) does not directly receive the external force, so that the valve device 1 does not receive the damage that causes the valve device 1 to become an open state. On this account, a fluid in the gas tank 10 does not flow out.

The housing 2 includes: a main block 21 that closes an opening of the gas tank 10; a case 23 that surrounds and covers from above the solenoid portion 8 provided above the main block 21; and a spacer 22 sandwiched between the main block 21 and the case 23. The solenoid portion 8 includes a bobbin member 25, a magnetic pole member 26, and a yoke member 24.

The main block 21 includes: a base portion located outside the gas tank 10; and a shaft portion projecting from the base portion toward the inner side of the gas tank 10. The shaft portion includes: a large-diameter portion that is threadedly engaged with the opening of the gas tank 10; and a small-diameter portion located at an upper side of the large-diameter portion. A sealing member 91 is attached to the large-diameter portion of the shaft portion so as to seal a gap between the large-diameter portion and the gas tank 10.

A main passage 3 is formed at the main block 21 and includes a primary passage 31, a first pressure chamber 32, and a secondary passage 33. One end (upstream end) of the primary passage 31 constitutes a primary port 3a that is formed on an outer peripheral surface of the large-diameter portion of the shaft portion and is open toward an internal space of the gas tank 10. One end (downstream end) of the secondary passage 33 constitutes a secondary port 3b (see FIG. 2) that is formed on an end surface of the base portion and is open toward an outside. A filter 11 is provided at the primary port 3a.

More specifically, a first slide chamber 28 is formed at the shaft portion of the main block 21 and holds the main valve body 4 such that the main valve body 4 is slidable in an upper-lower direction. A tubular member 27 extending in the upper-lower direction is provided in the shaft portion of the main block 21 so as to be located under the first slide chamber 28. An inner diameter of an upper portion of the tubular member 27 is relatively large, and an inner diameter of a lower portion of the tubular member 27 is relatively small. A valve seat for the main valve body 4 is formed at a stepped portion formed between the upper portion and lower portion of the tubular member 27. To be specific, since the main valve body 4 is inserted into the tubular member 27, the first pressure chamber 32 is formed between an inner peripheral surface of the tubular member 27 and an outer peripheral surface of the main valve body 4. That is, the first pressure chamber 32 is constituted by the upper portion of the tubular member 27 and a lower portion of the main valve body 4.

Further, a circular space 31b is formed at the shaft portion of the main block 21 so as to surround the upper portion of the tubular member 27, and a passage 31a is formed so as to extend from the primary port 3a to the circular space 31b. A plurality of through holes 31c through which the first pressure chamber 32 and the circular space 31b communicate with each other is formed at the upper portion of the tubular member 27. To be specific, the primary passage 31 is constituted by the passage 31a, the circular space 31b, and the through holes 31c.

A passage 33b is formed at the main block 21 so as to extend from a lower opening of the tubular member 27 to the secondary port 3b. To be specific, the secondary passage 33 is constituted by the passage 33b and a portion 33a that is a portion located under the valve seat inside the tubular member 27. A sealing member 92 is attached to the tubular member 27 so as to prevent a gas from leaking from the circular space 31b to the passage 33b.

The magnetic pole member 26 is provided above the shaft portion of the main block 21. A second slide chamber 29 is formed between the main block 21 and the magnetic pole member 26 and holds the pilot valve body 6 such that the pilot valve body 6 is slidable in the upper-lower direction. The spacer 22, the yoke member 24, and the bobbin member 25 are provided in this order from a lower side to an upper side so as to surround the small-diameter portion of the shaft portion of the main block 21 and the magnetic pole member 26. Since a lower small-diameter portion of the pilot valve body 6 is inserted into an inside of an upper portion of the main valve body 4, a space is formed between an inner peripheral surface of the upper portion of the main valve body 4 and an outer peripheral surface of the lower small-diameter portion of the pilot valve body 6. This space and the second slide chamber 29 constitute a second pressure chamber 50. In other words, the main valve body 4 is interposed as a separating member between the first pressure chamber 32 and the second pressure chamber 50, and the pilot valve body 6 is provided in the second pressure chamber 50.

To prevent the second pressure chamber 50 from being divided into an upper portion and a lower portion by the pilot valve body 6, a vertical hole 61 extending on the center line and a horizontal hole 62 intersecting with a lower end of the vertical hole 61 are formed at the pilot valve body 6. A space at a lower side of the pilot valve body 6 and a space at an upper side of the pilot valve body 6 in the second pressure chamber 50 communicate with each other through the vertical hole 61 and the horizontal hole 62. Sealing members 93 are attached to the main valve body 4 so as to prevent gas leakage between the first pressure chamber 32 and the second pressure chamber 50 and seal a gap between the first pressure chamber 32 and the second pressure chamber 50.

The main valve body 4 moves between a closed position where the main valve body 4 is seated on the valve seat in the tubular member 27 to isolate the first pressure chamber 32 from the secondary passage 33 and an open position where the main valve body 4 moves upward away from the valve seat to cause the first pressure chamber 32 to communicate with the secondary passage 33. A stopper 21a is formed at the shaft portion of the main block 21 so as to project in the second pressure chamber 50 and limit the movement of the main valve body 4 in the upper direction. To be specific, the stopper 21a defines the open position of the main valve body 4.

The pilot valve body 6 also serves as a movable core driven by the solenoid portion 8. A coil 81 is wound around the bobbin member 25. The coil 81, the bobbin member 25, the magnetic pole member 26, and the yoke member 24 are components of the solenoid portion 8. A cable 85 extends from the solenoid portion 8 to the outside so as to penetrate the spacer 22 and the main block 21.

A first pilot passage 5 is formed at the housing 2 so as to extend from an outside of the housing 2, that is, the internal space of the gas tank 10 to the second pressure chamber 50. In the present embodiment, the first pilot passage 5 extends in the upper-lower direction so as to penetrate the case 23 and the magnetic pole member 26. An upper end of the first pilot passage 5 which end opens toward the internal space of the gas tank 10 constitutes a pilot port 5a. A first restrictor 51 constituted by a thin passage is provided at an end portion of the first pilot passage 5, the end portion being located at the second pressure chamber 50 side. A filter 11 is provided at the first pilot passage 5 so as to be located above the first restrictor 51.

A second pilot passage 45 is formed at the main valve body 4. The second pilot passage 45 extends on the center line of the main valve body 4 in the upper-lower direction so as to penetrate the main valve body 4. Therefore, even in a case where the main valve body 4 is located at the closed position, the second pressure chamber 50 communicates with the secondary passage 33 through the second pilot passage 45 when the pilot valve body 6 is being attracted to the magnetic pole member 26 by the electromagnetic force of the solenoid portion 8. A second restrictor 46 constituted by an orifice is provided at an end portion of the second pilot passage 45, the end portion being located at the second pressure chamber 50 side.

A valve seat for the pilot valve body 6 is formed at the main valve body 4 so as to surround an upper end (an opening of the second restrictor 46 toward the second pressure chamber 50) of the second pilot passage 45. The pilot valve body 6 moves between a first operation position where the pilot valve body 6 is seated on the valve seat to isolate the second pressure chamber 50 from the second pilot passage 45 and a second operation position away from the first operation position toward an opposite side of the main valve body 4. To be specific, the upper end of the second pilot passage 45 is opened and closed by the pilot valve body 6.

A pilot valve body biasing member (hereinafter referred to as a "first biasing member") 71 that biases the pilot valve body 6 toward the main valve body 4 is provided in the second pressure chamber 50 so as to be located between the pilot valve body 6 and the magnetic pole member 26. The pilot valve body 6 is maintained at the first operation position by a biasing force Fp of the first biasing member 71. In contrast, the solenoid portion 8 generates the electromagnetic force by the current flow to move the pilot valve body 6 to the second operation position against the biasing force Fp of the first biasing member 71. The second operation position is a position where the pilot valve body 6 is being attracted to the magnetic pole member 26.

Further, in the present embodiment, a main valve body biasing member (hereinafter referred to as a "second biasing member") 72 that biases the main valve body 4 toward the pilot valve body 6 is provided in the first pressure chamber 32 so as to be located between the main valve body 4 and the tubular member 27. When the pilot valve body 6 is located at the second operation position, the main valve body 4 is maintained at the open position by a biasing force Fs of the second biasing member 72. The biasing force Fs of the second biasing member 72 is lower than the biasing force Fp of the first biasing member 71 (Fp>Fs).

When the current is not flowing through the solenoid portion 8, and the pilot valve body 6 is located at the first operation position, a gas does not flow through the first pilot passage 5 or the second pilot passage 45, and internal pressure P3 that is pressure of the second pressure chamber 50 is equal to the primary pressure P1 that is the pressure of the primary passage 31 (P3=P1). The primary pressure P1 is higher than the secondary pressure P2 that is the pressure of the secondary passage 33. A downward force represented by A1*(P1−P2)+(Fp−Fs) acts on the main valve body 4, where A1 denotes the area of the valve seat for the main valve body 4. Therefore, the main valve body 4 is maintained at the closed position.

When the current flows through the solenoid portion 8, and the pilot valve body 6 is therefore moved to the second operation position, the gas flows through the first pilot passage 5 and the second pilot passage 45. On this account, the internal pressure P3 becomes lower than the primary pressure P1 and higher than the secondary pressure P2 (P1>P3>P2). Here, a circular area obtained by subtracting the area A1 from a cross-sectional area A0 of the first slide chamber 28 is denoted by A2 (A2=A0−A1). In this case, when the internal pressure P3 is lower than the primary pressure P1 and higher than the secondary pressure P2, a downward force F1 represented by A1*(P3−P2), an upward force F2 represented by A2*(P1−P3), and the biasing force Fs of the second biasing member 72 act on the main valve body 4 located at the closed position. The areas A1 and A2, the first restrictor 51 and the second restrictor 46 that define the internal pressure P3, and the biasing force Fs are set such that the sum of the upward force F2 and the biasing force Fs becomes higher than the downward force F1 (F2+Fs>F1). Therefore, the pilot valve body 6 moves to the second operation position, and at the same time, the main valve body 4 moves from the closed position to the open position.

In the present embodiment, a stroke ΔL1 of the movement of the pilot valve body 6 between the first operation position and the second operation position is set to be longer than a stroke ΔL2 of the movement of the main valve body 4 between the closed position and the open position. Therefore, when the pilot valve body 6 is located at the second operation position, and the main valve body 4 is located at the open position, a gap is formed between the pilot valve body 6 and the main valve body 4. To be specific, when the main passage 3 is being opened by the main valve body 4, the upper end of the second pilot passage 45 is also open.

When the current flowing through the solenoid portion 8 is stopped, the pilot valve body 6 first closes the upper end of the second pilot passage 45 by the biasing force Fp of the first biasing member 71. With this, the internal pressure P3 becomes equal to the primary pressure P1, and the main valve body 4 moves from the open position to the closed position to close the main passage 3.

According to the valve device 1 of the present embodiment explained above, since the main valve body 4 performs the opening operation by the pressure difference acting on the main valve body 4, the excellent responsiveness can be realized. Especially, by increasing the circular area A2 on which the pressure difference represented by P1-P3 acts, the influence of the secondary pressure P2 can be reduced, and the higher responsiveness can be obtained. When the pilot valve body 6 is located at the second operation position, the main valve body 4 is maintained at the open position by the second biasing member 72. Therefore, even if the internal pressure P3 has become equal to the primary pressure P1, the main valve body 4 is prevented from performing the closing operation.

Figure 3:
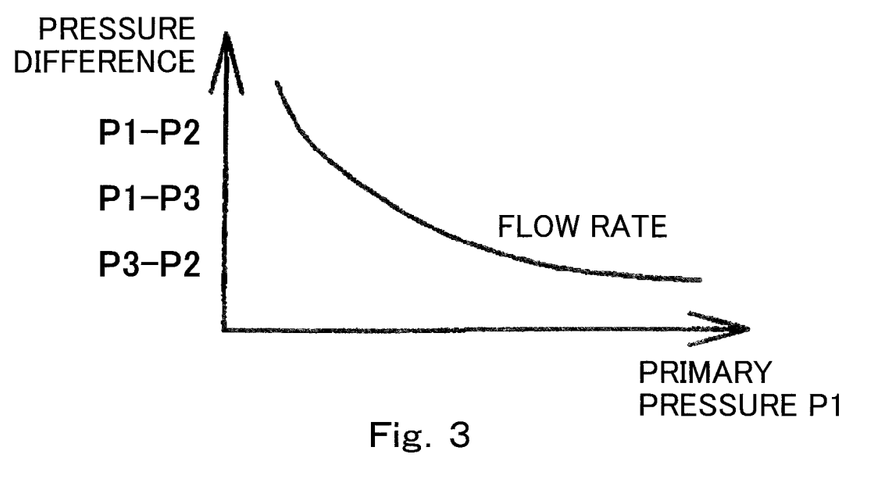
FIG. 3 is a graph showing a relation between primary pressure and a pressure difference.

In recent years, storage pressure of, for example, a gas tank that stores hydrogen used in a fuel-cell vehicle has been increasing, and primary pressure significantly changes from 70 MPa to 2 MPa. As shown in FIG. 3, each of the pressure differences that are respectively represented by P1-P2, P1-P3, and P3-P2 and cause the main valve body 4 to perform the opening/closing operations correlates inversely with the primary pressure P1. Therefore, according to the conventional valve device 200 shown in FIG. 7, if the secondary pressure P2 fluctuates when the primary pressure P1 is high, the main valve body 220 performs the closing operation in some cases when the main passage 210 is being opened by the main valve body 220, since the main valve body 220 is being biased by the spring 240 in a closing direction. In other words, holding the open state of the main valve body 220 is unstable. In contrast, according to the valve device 1 of the present embodiment, even if the secondary pressure P2 fluctuates when the main passage 3 is being opened, the main valve body 4 is maintained at the open position by the second biasing member 72, so that the main valve body 4 is maintained at the open position. Therefore, the valve device 1 of the present embodiment can obtain an excellent property of holding the open state. At this time, the main valve body 4 is maintained at the open position by the second biasing member 72. Therefore, even if the pressure of the second pressure chamber 50 has become equal to the primary pressure, the open state of the main valve body 4 is surely held, and the main valve body 4 is prevented from performing the closing operation.

According to the conventional valve device 200 shown in FIG. 7, the solenoid portion 260 is provided outside the gas tank. Therefore, there is a possibility that, for example, in a case where a fuel-cell vehicle has collided, the solenoid portion 260 is damaged. However, according to the present embodiment, the solenoid portion 8 is provided inside the gas tank 10, so that the damage of the solenoid portion at the time of the collision is avoidable. On this account, the valve device 1 of the present embodiment is much safer than the conventional valve device 200.

In addition, according to the valve device 1 of the present embodiment, the gas can be caused to flow back through the main passage 3, so that the valve device 1 of the present embodiment is applicable to a bidirectional system that realizes the supply and filling of a fuel gas.

Modification Example

The present invention is not limited to the above-described embodiment, and various modifications may be made within the spirit of the present invention.

Figure 4:
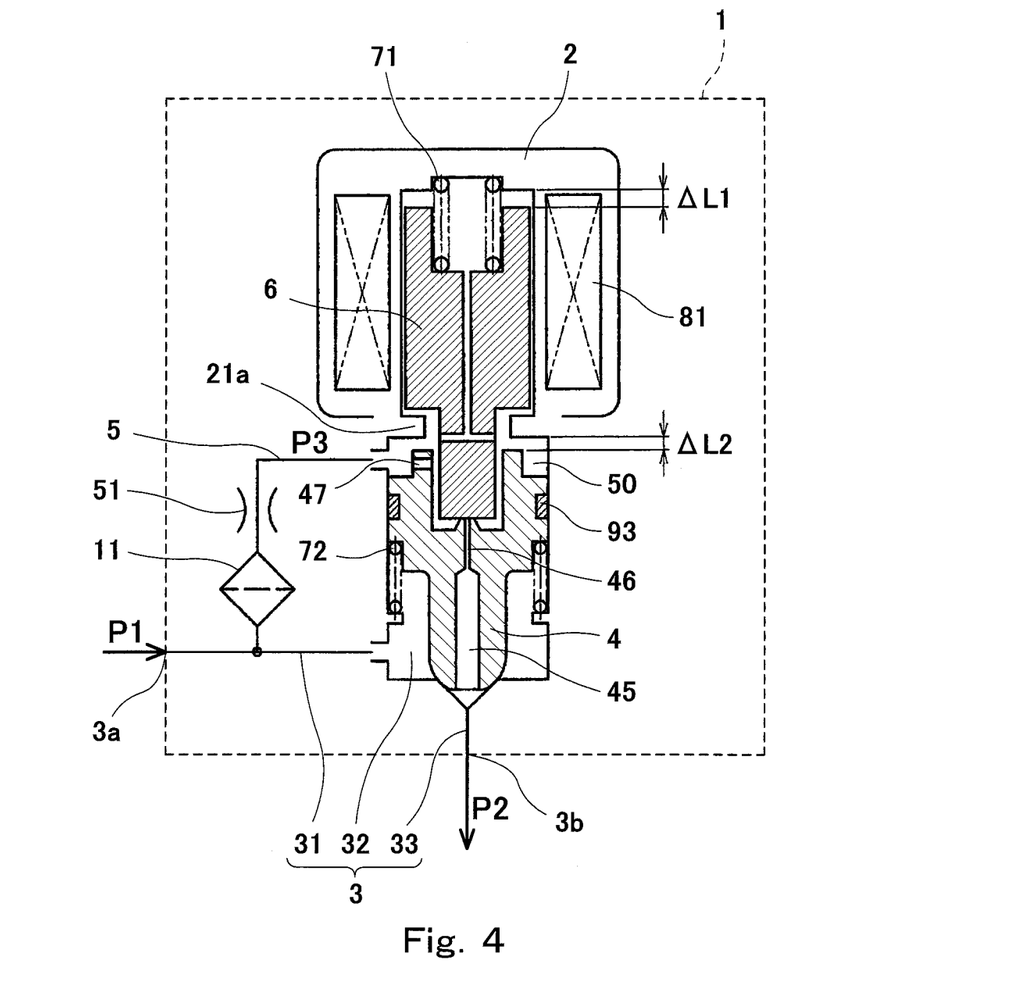
FIG. 4 is a schematic diagram of the valve device of a modification example.

For example, as shown in FIG. 4, the first pilot passage 5 may be formed at the housing 2 so as to extend from the primary passage 31 to the second pressure chamber 50. This configuration is preferable in a case where the valve device 1 is incorporated in a pneumatic circuit.

In the example shown in FIG. 4, a downstream end of the first pilot passage 5 is open immediately under the stopper 21a. Therefore, in order to allow the gas flow from the first pilot passage 5 to the second pilot passage 45 even when the main valve body 4 is located at the closed position, a through hole 47 is formed at the main valve body 4.

Figure 5:
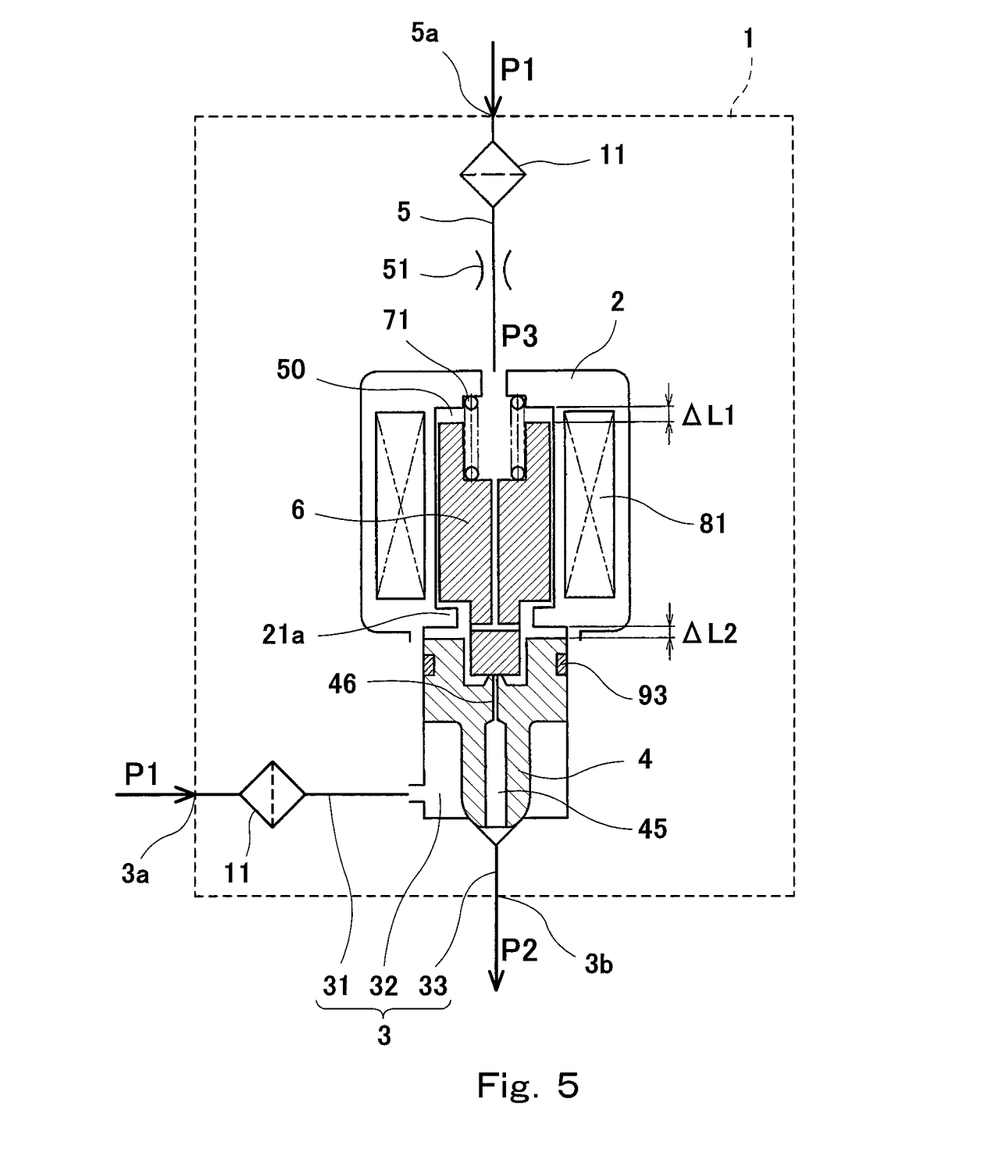
FIG. 5 is a schematic diagram of the valve device of another modification example.

According to the above-described embodiment, the second biasing member 72 that biases the main valve body 4 toward the pilot valve body 6 is provided in the first pressure chamber 32 so as to be located between the main valve body 4 and the tubular member 27. However, as shown in FIG. 5, the second biasing member 72 does not have to be provided. In this case, the responsiveness of the valve device 1 slightly deteriorates. However, since the biasing force of the first biasing member 71 for seating the pilot valve body 6 and the main valve body 4 (i.e., for maintaining the pilot valve body 6 at the first operation position and maintaining the main valve body 4 at the closed position) can be reduced, the required thrust of the solenoid portion 8 can be reduced. As a result, there is obtained an advantage of being able to reduce the size of the solenoid portion 8. In addition, while the current is flowing through the solenoid portion 8, the pilot valve body 6 is maintained at the second operation position, and the biasing force of the first biasing member 71 does not act on the main valve body 4, so that the main valve body 4 is prevented from performing the closing operation. As with the above, in the modification example shown in FIG. 4, the second biasing member 72 does not have to be provided, and the same advantage as above can be obtained.

The stroke ΔL1 of the pilot valve body 6 may be equal to the stroke ΔL2 of the main valve body 4. In this case, when the main valve body 4 is located at the open position, the upper end of the second pilot passage 45 is closed, and the internal pressure P3 becomes equal to the primary pressure P1, so that a force for maintaining the main valve body 4 at the open position is only the biasing force Fs of the second biasing member 72. When the stroke ΔL1 is longer than the stroke ΔL2, the internal pressure P3 becomes lower than the primary pressure P1, so that as the force for maintaining the main valve body 4 at the open position, a force corresponding to the pressure difference between the primary pressure P1 and the internal pressure P3 can be used in addition to the biasing force Fs of the second biasing member 72. Therefore, the main valve body can be stably maintained at the open position.

The present invention is applicable to valve devices for various applications.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the spirit of the present invention.

What is claimed is:

1. A valve device comprising:
    a housing at which a main passage and a second pressure chamber are separately formed, the main passage including a primary passage, a first pressure chamber, and a secondary passage;
    a main valve body interposed between the first pressure chamber and the second pressure chamber, the main valve body being configured to, when pressure of the second pressure chamber becomes lower than pressure of the first pressure chamber, move from a closed position where the main valve body isolates the first pressure chamber from the secondary passage to an open position where the main valve body causes the first pressure chamber to communicate with the secondary passage;
    a first pilot passage including a first restrictor and extending from an outside of the housing or the primary passage to the second pressure chamber;
    a second pilot passage including a second restrictor and formed at the main valve body so as to connect the second pressure chamber and the secondary passage when the main valve body is located at the closed position;
    a pilot valve body provided in the second pressure chamber, the pilot valve body being configured to move between a first operation position where the pilot valve body isolates the second pressure chamber from the second pilot passage and a second operation position away from the first operation position toward an opposite side of the main valve body;
    a pilot valve body biasing member configured to bias the pilot valve body toward the main valve body to maintain the pilot valve body at the first operation position; and
    a valve body driving unit configured to move the pilot valve body to the second operation position by a current flowing through the valve body driving unit, wherein:
    the first pressure chamber and the second pressure chamber are separated from each other by the main valve body; and
    a sealing member is provided between the housing and the main valve body to seal a gap between the first pressure chamber and the second pressure chamber.

2. The valve device according to claim 1, further comprising a main valve body biasing member configured to bias the main valve body toward the pilot valve body to maintain the main valve body at the open position when the pilot valve body is located at the second operation position.

3. The valve device according to claim 1, wherein:
a stroke of a movement of the pilot valve body between the first operation position and the second operation position is longer than a stroke of a movement of the main valve body between the closed position and the open position; and
when the pilot valve body is located at the second operation position, and the main valve body is located at the open position, a gap is formed between the pilot valve body and the main valve body.

4. The valve device according to claim 1, wherein:
the valve device is incorporated in a pressure vessel so as to be partially exposed from the pressure vessel;
the primary passage and the first pilot passage communicate with an inside of the pressure vessel; and
the valve body driving unit is provided inside the pressure vessel.

5. The valve device according to claim 1, wherein the first pilot passage extends through the pilot valve body.

* * * * *